US012462825B2

(12) United States Patent
Guerin et al.

(10) Patent No.: US 12,462,825 B2
(45) Date of Patent: Nov. 4, 2025

(54) ESTIMATING AN OPTIMIZED MASK FOR PROCESSING ACQUIRED SOUND DATA

(71) Applicant: Orange, Issy-les-Moulineaux (FR)

(72) Inventors: Alexandre Guerin, Chatillon (FR); Henrique Tomaz-Amorim, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 197 days.

(21) Appl. No.: 18/553,378

(22) PCT Filed: Mar. 18, 2022

(86) PCT No.: PCT/FR2022/050495
§ 371 (c)(1),
(2) Date: Sep. 29, 2023

(87) PCT Pub. No.: WO2022/207994
PCT Pub. Date: Oct. 6, 2022

(65) Prior Publication Data
US 2024/0212701 A1 Jun. 27, 2024

(30) Foreign Application Priority Data
Apr. 1, 2021 (FR) ....................................... 2103400

(51) Int. Cl.
*G10L 19/00* (2013.01)
*G10L 21/0208* (2013.01)
*G10L 21/0216* (2013.01)

(52) U.S. Cl.
CPC ..................... *G10L 21/0208* (2013.01); *G10L 2021/02166* (2013.01)

(58) Field of Classification Search
CPC ............. G10L 21/0208; G10L 21/0232; G10L 2021/02166
(Continued)

(56) References Cited

U.S. PATENT DOCUMENTS 10,522,167 B1 12/2019 Ayrapetian et al.
2016/0086602 A1 3/2016 Hwang et al.
(Continued)

FOREIGN PATENT DOCUMENTS

CN 110503972 A 11/2019

OTHER PUBLICATIONS

English translation of the Written Opinion of the International Searching Authority dated Jun. 13, 2022 for corresponding International Application No. PCT/FR2022/050495, filed Mar. 18, 2022.
(Continued)

*Primary Examiner* — Md S Elahee
(74) *Attorney, Agent, or Firm* — David D. Brush; Westman, Champlin & Koehler, P.A.

(57) ABSTRACT

A method and apparatus for processing sound data acquired by a plurality of microphones. The method includes: on the basis of the signals acquired by the plurality of microphones, determining a direction of arrival of a sound originating from at least one sound source of interest; applying spatial filtering to the sound data as a function of the direction of arrival of the sound; estimating ratios, in the time-frequency domain, in a magnitude representative of a signal amplitude, between the filtered sound data on the one hand and the acquired sound data on the other hand; and as a function of the estimated ratios, producing a weight mask to be applied in the time-frequency domain to the acquired sound data in order to construct an acoustic signal representing the sound originating from the source of interest but enhanced relative to the ambient noise.

13 Claims, 3 Drawing Sheets

(58) Field of Classification Search
USPC .......................................................... 704/226
See application file for complete search history.

(56) References Cited

U.S. PATENT DOCUMENTS

| | | | |
|---|---|---|---|
| 2021/0082450 A1 | 3/2021 | Jensen et al. | |
| 2024/0282327 A1* | 8/2024 | Mohammad ........ | G10L 21/0232 |

OTHER PUBLICATIONS

International Search Report dated Jun. 13, 2022 for corresponding International Application No. PCT/FR2022/050495, filed Mar. 18, 2022.

Written Opinion of the International Searching Authority dated Jun. 13, 2022 for corresponding International Application No. PCT/FR2022/050495, filed Mar. 18, 2022.

Amélie Bosca et al. "Dilated U-net based approach for multichannel speech enhancement from First-Order Ambisonics recordings". In: Computer Speech & Language (2020), pp. 37-51.

L. Perotin et al. "Multichannel speech separation with recurrent neural networks from high-order Ambisonics recordings". In: Proc. of ICASSP.ICASSP 2018—IEEE International Conference on Acoustics, Speech and Signal Processing. 2018, pp. 36-40.

Reinhold Heab-Umbach et al. "Far-Field Automatic Speech Recognition," Sep. 20, 2020, arXiv:2009.09395v1.

J. Heymann, et al., "Neural network based spectral mask estimation for acoustic beamforming," in Proc. of ICASSP, 2016, pp. 196-200.

A. Jansson, et al., "Singing voice separation with deep U-net convolutional networks," in Proc. of Int. Soc. for Music Inf. Retrieval, 2017, pp. 745-751.

D. Stoller, et al., "Wave-U-Net: a multi-scale neural network for end-to-end audio source separation," in Proc. of Int. Soc. for Music Inf. Retrieval, 2018, pp. 334-340.

Sharon Gannot et al. "A Consolidated Perspective on Multimicrophone Speech Enhancement and Source Separation". In: IEEE/ACM Transactions on Audio, Speech, and Language Processing 25.4 (Apr. 2017), pp. 692-730.issn: 2329-9304.doi: 10.1109/TASLP.2016.2647702.

J. Dibiase, et al., "Robust localization in reverberant rooms," in Microphone Arrays: Signal Processing Techniques and Applications. Springer, 2001, pp. 157-180.

DeLiang Wang, "Time-Frequency Masking for Speech Separation and Its Potential for Hearing Aid Design," Trends in Amplification, vol. 12 No. 4, Dec. 2008 332-353, DOI: 10.1177/1084713808326455.

* cited by examiner

ESTIMATING AN OPTIMIZED MASK FOR PROCESSING ACQUIRED SOUND DATA

CROSS-REFERENCE TO RELATED APPLICATIONS

This Application is a Section 371 National Stage Application of International Application No. PCT/FR2022/050495, filed Mar. 18, 2022, which is incorporated by reference in its entirety and published as WO 2022/207994 A1 on Oct. 6, 2022, not in English.

TECHNICAL FIELD

The present description relates to the processing of sound data, in particular in the context of far-field sound capture.

Far-field sound capture occurs, for example, when a spokesperson is far away from the sound capture equipment. However, it offers advantages as demonstrated by the true ergonomic ease with which a user interacts "hands-free" with a service the user is currently using: making a phone call, issuing voice commands via a smart speaker device (Google Home®, Amazon Echo®, etc.).

On the other hand, far-field sound capture introduces certain artifacts: reverberation and surrounding noises appear amplified due to the distance from the user. These artifacts degrade the intelligibility of the speaker's voice, and consequently the operation of the services. It seems apparent that communication is more difficult, whether with a human or with a voice recognition engine.

Also, hands-free terminals (such as smart speakers or conference phones) are generally equipped with a microphone antenna that enhances the desired signal by reducing these disruptions. Antenna-based enhancement exploits the spatial information encoded during multi-channel recording and specific to each source, to differentiate the signal of interest from other noise sources.

Many antenna processing techniques exist, such as a "Delay and Sum" filter performing purely spatial filtering by knowing only the direction of arrival from the source of interest or from other sources, or an "MVDR" filter (for "Minimum Variance Distortionless Response") which is shown to be slightly more effective due to knowing the spatial distribution of the noise, in addition to knowing the direction of arrival from the source of interest. Other even more efficient filters such as Multichannel Wiener filters also require that the spatial distribution of the source of interest be available.

In practice, knowledge of these spatial distributions comes from knowledge of a time-frequency map which indicates the points in this map dominated by speech and the points dominated by noise. The estimate of this map, which is also called a mask, is generally inferred by a previously trained neural network.

Hereafter, a signal which contains a mixture of speech and noise in the time-frequency domain is denoted $x(t,f)=s(t,f)+n(t,f)$, where $s(t,f)$ is the speech and $n(t,f)$ the noise.

A mask, denoted $\hat{m}_s(t,f)$ (respectively $\hat{m}_n(t,f)$), is defined as a real number, generally within the interval [0; 1], such that an estimate of the signal of interest $\hat{s}(t,f)$ (respectively the noise $n(t,f)$) is obtained by simple multiplication of this mask with the observations $x(t,f)$, i.e.:

$$\hat{s}(t,f) \approx \hat{m}_s(t,f)x(t,f)$$

$$\hat{n}(t,f) \approx \hat{m}_n(t,f)x(t,f)$$

We therefore seek an estimate of masks $\hat{m}_s(t,f)$ and $\hat{m}_n(t,f)$ which can lead to deriving effective separation or enhancement filters.

PRIOR ART

The use of deep neural networks (in an approach which makes use of artificial intelligence) has been used for source separation. A description of such an implementation is presented for example in document [@umbachChallenge] for which the references are given in the appendix below. Architectures such as the simplest "Feed Forward" (FF) type have been investigated and have shown their effectiveness compared to signal processing methods, generally based on models (as described in the reference [@heymannNNmask]). "Recurrent" architectures of the type referred to as "LSTM" (Long-Short Term Memory, as described in [@laurelineLSTM]) or "Bi-LSTM" (as described in [@heymannNNmask]), which make it possible to better exploit the temporal dependencies of the signals, show better performance but at a very high computational cost. To reduce this computational cost, whether for training or inference, convolutional architectures known as "CNN" (Convolutional Neural Network) have been successfully proposed ([@amelieUnet], [@janssonUnetSinger]), improving performance and reducing the calculation cost, in addition with the possibility of performing the calculations in parallel. While the artificial intelligence approaches to separation generally exploit characteristics in the time-frequency domain, purely temporal architectures have also been successfully employed ([@stollerWaveUnet]).

All these artificial intelligence approaches to enhancement and separation give real added value for tasks where noise is a problem: transcription, recognition, detection. However, these architectures all have in common a high cost in terms of memory and computing power. Deep neural network models are composed of dozens of layers and hundreds of thousands, or even millions, of parameters. In addition, their learning requires large exhaustive databases, annotated and recorded under realistic conditions, in order to ensure their generalization to all conditions of use.

SUMMARY

This description improves the situation.

A method for processing sound data acquired by a plurality of microphones is proposed, wherein:

- on the basis of the sound data acquired by the plurality of microphones, a direction of arrival of a sound originating from at least one sound source of interest is determined,
- spatial filtering is applied to the sound data as a function of the direction of arrival of the sound,
- ratios in a magnitude representative of a signal amplitude are estimated in the time-frequency domain, between the filtered sound data on the one hand and the acquired sound data on the other hand,
- as a function of the estimated ratios, a weight mask is produced to be applied in the time-frequency domain to the acquired sound data in order to construct an acoustic signal representing the sound originating from the source of interest (and enhanced thereby relatively to the ambient noise).

Here, the term "quantity representative" of a signal amplitude means the amplitude of the signal but also its energy or its power, etc. Thus, the aforementioned ratios can be estimated by dividing the amplitude (or energy, or power, etc.) of the signal represented by the filtered sound data, by the amplitude (or energy, or power, etc.) of the signal represented by the acquired (therefore raw) sound data.

The weight mask thus obtained is then representative, at each time-frequency point of the time-frequency domain, of a degree of preponderance of the sound source of interest, relative to the ambient noise.

The weight mask can be estimated in order to directly construct an acoustic signal representing the sound originating from the source of interest, and enhanced relative to the ambient noise, or to calculate second spatial filters which can be more effective in more strongly reducing noise than in the aforementioned case of direct construction.

In general, it is then possible to obtain a time-frequency mask without making use of neural networks, the only prior knowledge being the direction of arrival from the relevant source. This mask then makes it possible to implement effective separation filters such as the MVDR filter ("Minimum Variance Distortionless Response") or filters from the family of Multichannel Wiener filters. Real-time estimation of this mask makes it possible to derive low-latency filters. In addition, its estimation remains effective even under adverse conditions where the signal of interest is drowned in the surrounding noise.

In one embodiment, the aforementioned first spatial filtering (applied to the data acquired before estimating the ratios) can be of the "Delay and Sum" type.

In practice, in such case, successive delays can be applied to the signals captured by microphones arranged along an antenna, for example. As the distances between the microphones and therefore the phase shifts inherent to these distances between these captured signals are known, it is thus possible to phase all these signals which can then be summed.

In the case of a transformation of signals acquired in the ambisonic domain, the amplitude of the signals represents these phase shifts inherent to the distances between microphones. Here again, it is possible to weight these amplitudes in order to implement a processing that can be described as "Delay and Sum".

In one variant, this first spatial filtering can be of the MPDR type (for "Minimum Power Distortionless Response"). This has the advantage of better reducing the surrounding noise while keeping the relevant signal intact, and does not require any information other than the direction of arrival. This type of process is described for example in document [@gannotResume], for which the content is detailed below and the full reference is given in the appendix.

Here, however, MPDR-type spatial filtering, denoted $w_{MPDR}$, can be given in one particular embodiment by:

$$w_{MPDR} = \frac{R_x^{-1} a_s}{a_s^H R_x^{-1} a_s},$$

where $a_s$ represents a vector defining the direction of arrival of the sound (or "steering vector"), and $R_x$ is a spatial covariance matrix estimated at each time-frequency point (t,f) by a relation of the type:

$$R_x(t, f) = \frac{1}{\mathrm{card}\{\Omega(t, f)\}} \sum_{(t_1, f_1) \in \Omega(t,f)} x(t_1, f_1) x(t_1, f_1)^H$$

where:

$\Omega$(t,f) is a neighborhood of the time-frequency point (t,f), card is the "cardinal" operator, $x(t_1,f_1)$ is a vector representing the sound data acquired in the time-frequency domain, and $x(t_1,f_1)^H$ its Hermitian conjugate.

Furthermore, as indicated above, the method may optionally include a subsequent step of refining the weight mask in order to denoise its estimate.

To carry out this subsequent step, the estimate can be denoised by smoothing, for example by applying local means, defined heuristically.

Alternatively, this estimate can be denoised by defining an initial mask distribution model.

The first approach keeps the complexity low, while the second approach, based on a model, obtains better performance at the cost of increased complexity.

Thus, in a first embodiment, the produced weight mask can be further refined by smoothing at each time-frequency point, by applying a local statistical operator, calculated over a time-frequency neighborhood of the time-frequency point (t,f) considered. This operator can take the form of an average, a Gaussian filter, a median filter, or other.

In a second embodiment, in order to carry out the aforementioned second approach, the produced weight mask can be further refined by smoothing at each time-frequency point, by applying a probabilistic approach which comprises:

- considering the weight mask as a random variable,
- defining a probabilistic estimator of a model of the random variable,
- searching for an optimum of the probabilistic estimator in order to improve the weight mask.

Typically, the mask can be considered as a uniform random variable within an interval [0,1].

The probabilistic estimator of the mask $M_s(t,f)$ can for example be representative of a maximum likelihood, over a plurality of observations of a pair of variables $\{\hat{s}_i, x_1\}_{i=1}^{I}$ respectively representing:

- an acoustic signal $\hat{s}_i$ resulting from applying the weight mask to the acquired sound data, and
- the acquired sound data $x_i$, said observations being chosen within a neighborhood I of the time-frequency point (t,f) considered.

These two embodiments are thus intended to refine the mask after its estimation. As indicated above, the mask obtained (optionally refined) can be applied directly to the acquired data (raw, captured by the microphones) or can be used to construct a second spatial filter to be applied to these acquired data.

Thus, in this second case, construction of the acoustic signal representing the sound originating from the source of interest and enhanced relative to the ambient noise, may involve the application of a second spatial filtering, obtained from the weight mask.

This second spatial filtering can be of the MVDR type (for "Minimum Variance Distortionless Response"), and in this case, at least one spatial covariance matrix $R_n$ is estimated for the ambient noise, the MVDR-type spatial filtering being given by $$w_{MVDR} = \frac{R_n^{-1} a_s}{a_s^H R_n^{-1} a_s},$$

with:

$$R_n(t, f) = \frac{1}{\text{card}\{\Omega(t, f)\}} \sum_{(t_1, f_1) \in \Omega(t, f)} (1 - M_s(t_1, f_1)) x(t_1, f_1) x(t_1, f_1)^H$$

where:

$\Omega$(t,f) is a neighborhood of a time-frequency point (t,f), card is the "cardinal" operator, $x(t_1,f_1)$ is a vector representing the sound data acquired in the time-frequency domain, and $x(t_1,f_1)^H$ its Hermitian conjugate, and $M_s(t_1,f_1)$ is the expression of the weight mask in the time-frequency domain.

Alternatively, the second spatial filtering can be of the MWF type (for "Multichannel Wiener Filter"), and in this case spatial covariance matrices $R_s$ and $R_n$ are respectively estimated for the acoustic signal representing the sound originating from the source of interest and from the ambient noise, the MWF-type spatial filtering being given by:

$w_{MWF}=(R_s+R_n)^{-1}R_s e_1$, where $e_1=[1\ 0\ \ldots\ 0]^T$, with:

$$R_s(t, f) = \frac{1}{\text{card}\{\Omega(t, f)\}} \sum_{(t_1, f_1) \in \Omega(t, f)} M_s(t_1, f_1) x(t_1, f_1) x(t_1, f_1)^H$$

$$R_n(t, f) = \frac{1}{\text{card}\{\Omega(t, f)\}} \sum_{(t_1, f_1) \in \Omega(t, f)} (1 - M_s(t_1, f_1)) x(t_1, f_1) x(t_1, f_1)^H$$

where:

$\Omega$(t,f) is a neighborhood of a time-frequency point (t,f), card is the "cardinal" operator, $x(t_1,f_1)$ is a vector representing the sound data acquired in the time-frequency domain, and $x(t_1,f_1)^H$ its Hermitian conjugate, and $M_s(t_1,f_1)$ is the expression of the weight mask in the time-frequency domain.

The above spatial covariance matrix Rn represents the "ambient noise". This noise may in fact include emissions from sound sources which have not been retained as being the sound source of interest. Separate processing can be carried out for each source for which a direction of arrival has been detected (for example dynamically) and, in the processing for a given source, the emissions from the other sources are considered to be part of the noise.

It is understood in this embodiment how the spatial filtering carried out, MWF for example, can be derived from the mask estimated for the most advantageous time-frequency points because the sound source of interest is preponderant there. It should also be noted that two joint optimizations can be carried out: one for the covariance $R_s$ of the acoustic signal, calling upon the desired time-frequency mask $M_s$, and the other for the covariance $R_n$ of the ambient noise, calling upon a mask $M_n$ linked to the noise (by selecting time-frequency points at which the noise alone is preponderant).

The solution described above thus makes it possible, in general, to estimate an optimal mask in a time-frequency domain at the time-frequency points where the source of interest is preponderant, based solely on information about the direction of arrival from the source of interest, with no contribution from a neural network (either for applying the mask directly to the acquired data, or for constructing a second spatial filtering to be applied to the acquired data).

This description also proposes a computer program comprising instructions for implementing all or part of a method as defined herein when the program is executed by a processor. According to another aspect, a non-transitory, computer-readable storage medium is provided on which such a program is stored.

This description also proposes a device comprising (as illustrated in FIG. 3) at least one interface (IN) for receiving sound data acquired by a plurality of microphones (MIC) and a processing circuit (PROC, MEM) configured for:

on the basis of the sound data acquired by the plurality of microphones, determining a direction of arrival of a sound originating from at least one sound source of interest, applying spatial filtering to the sound data as a function of the direction of arrival of the sound, estimating ratios, in the time-frequency domain, in a magnitude representative of a signal amplitude, between the filtered sound data on the one hand and the acquired sound data on the other hand, and as a function of the estimated ratios, producing a weight mask to be applied in the time-frequency domain to the acquired sound data in order to construct an acoustic signal representing the sound originating from the source of interest (and enhanced thereby relatively to the ambient noise).

Thus, the device may further comprise an output interface (denoted OUT in FIG. 3) for delivering this acoustic signal. This interface OUT may be connected to a voice recognition module for example in order to correctly interpret commands from a user in spite of ambient noise, the delivered acoustic signal having therefore been processed according to the method presented above.

BRIEF DESCRIPTION OF DRAWINGS

Other features, details and advantages will become apparent upon reading the detailed description below, and upon analyzing the appended drawings, in which.

DESCRIPTION OF EMBODIMENTS

Referring again to FIG. 3 here, the processing circuit of device DIS presented above can typically comprise a memory MEM capable of storing the instructions of the aforementioned computer program, as well as a processor PROC capable of cooperating with memory MEM in order to execute the computer program.

Figure 1:
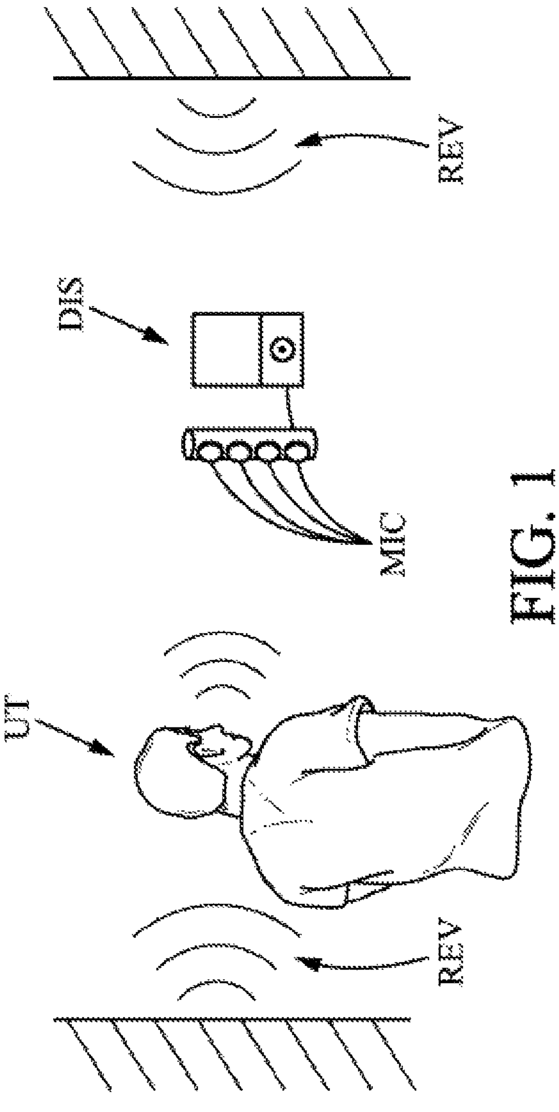
FIG. 1 schematically shows a possible context for making use of the method presented above.

Typically, output interface OUT can supply a voice recognition module MOD of a personal assistant capable of identifying, in the aforementioned acoustic signal, a voice command from a user UT who, as illustrated in FIG. 1, may speak a voice command captured by a microphone antenna MIC, in particular doing so in the presence of ambient noise and/or sound reverberations REV generated by the walls and/or partitions of a room for example in which user UT is located. Processing the acquired sound data, within the meaning of the present description and detailed below, nevertheless makes it possible to overcome such difficulties.

Figure 2:
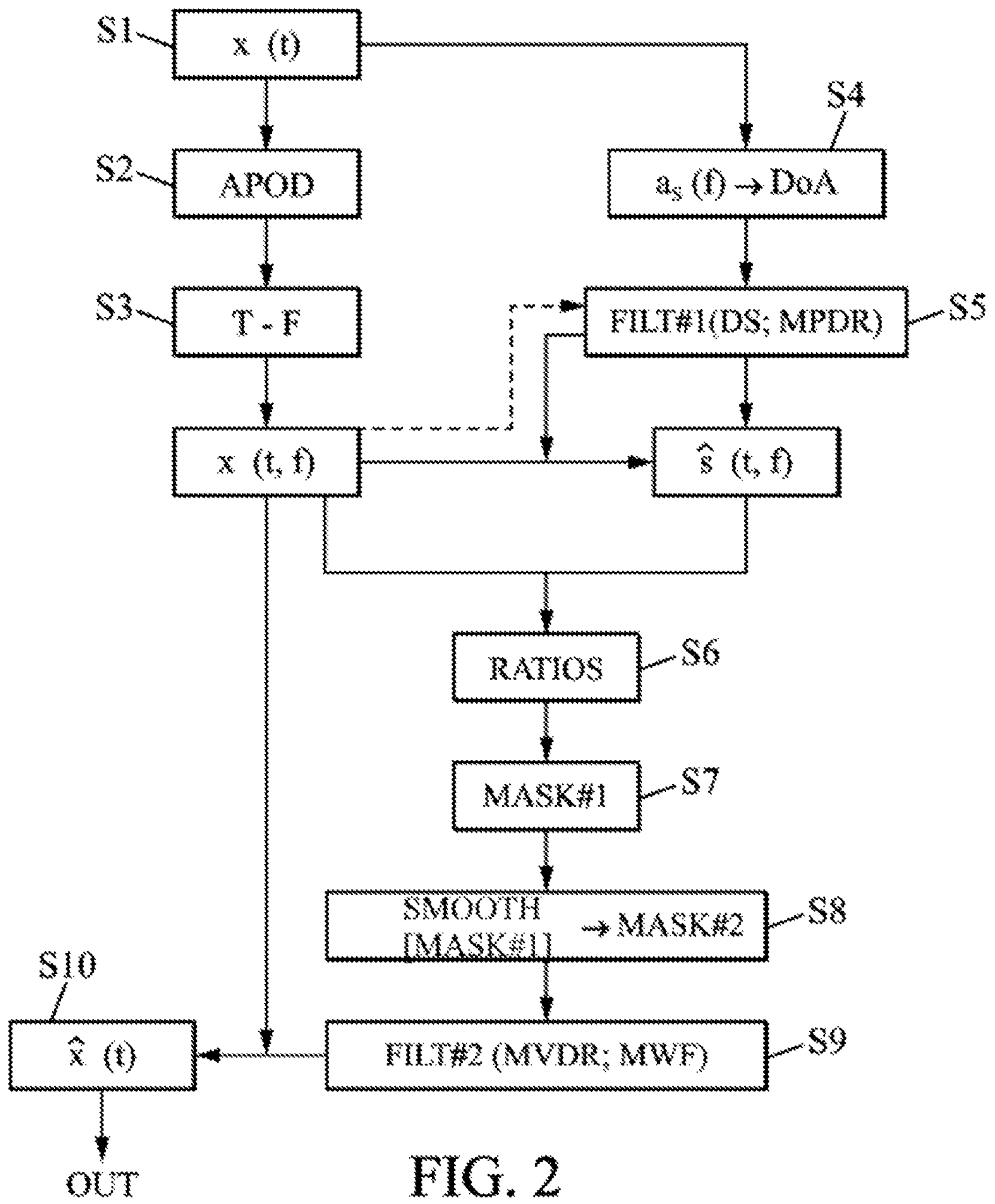
FIG. 2 illustrates a succession of steps that may be included in a method within the meaning of the present description, according to one particular embodiment.

One example of a general method within the meaning of this description is illustrated in FIG. 2. The method begins with a first step S1 of acquiring sound data captured by the microphones. Next, a time-frequency transform of the acquired signals is performed in step S3, after an apodization carried out in step S2. The direction of arrival of the sound originating from the source of interest (DoA) can then be estimated in step S4, in particular giving the vector $a_s(f)$ of this direction of arrival (or "steering vector"). Next, in step S5, a first spatial filtering is applied to the sound data captured by the microphones, for example in the time-frequency space, and as a function of the direction of arrival DoA. The first spatial filtering can be of the Delay and Sum or MPDR type and it is "centered" on the DoA. In the case where the filter is of the MPDR type, the acquired data expressed in the time-frequency domain are used, in addition to the DoA, to construct the filter (arrow illustrated with dotted lines for this purpose). Then, in step S6, amplitude (or energy or power) ratios are estimated between the filtered acquired data and the raw acquired data (denoted x(t,f) in the time-frequency domain). This estimation of the ratios in the time-frequency domain makes it possible to construct a first approximate form of the weight mask in step S7, already favoring the DoA because the aforementioned ratios are high in level primarily in the direction of arrival DoA. Next, a later, optional step S8 may be provided, consisting of smoothing this first mask in order to refine it. Then, in step S9 (also optional), it is also possible to generate a second spatial filtering from this refined mask. This second filtering can then be applied in the time-frequency domain to the acquired sound data in order to generate, in step S10, an acoustic signal substantially devoid of noise and which can then be interpreted properly by a voice recognition module or other. Each step of this method is detailed below.

An antenna signal composed of N channels is denoted x(t) below, organized in the form of a column vector in step S1:

$$x(t) = \begin{bmatrix} x_0(t) \\ \vdots \\ x_{N-1}(t) \end{bmatrix}$$

This vector is referred to as an "observation" or "mixture" vector.

The signals $x_i$, $0 \le i < N$ may be the signals captured directly by the microphones of the antenna, or a combination of these microphone signals as in the case of an antenna collecting the signals according to a representation in surround sound format (also called "ambisonic").

In the following, the various quantities (signals, covariance matrices, masks, filters) are expressed in a time-frequency domain, in step S3, as follows:

$$x(t, f) = \begin{bmatrix} \mathbb{F}\{x_0(t)\}(f) \\ \vdots \\ \mathbb{F}\{x_{N-1}(t)\}(f) \end{bmatrix}$$

where $\mathbb{F}\{.\}$ is for example the short-time Fourier transform of size L:

$$x(t, f) = \mathbb{F}\{x(t)\}(f) = \sum_{k=0}^{L-1} \tilde{x}_{L,M}(t-k) e^{-2i\pi kf/L},\ 0 \le f < L$$

In the above relation, $\tilde{x}_{L,M}(t)$ is a version of variable x(t) potentially apodized in step S2 by a window w(k) and zero padded:

$$\tilde{x}_{L,M}(t-k) = \begin{cases} x(t-k)w(k), & \text{if } k < m \\ 0, & \text{if not} \end{cases}$$

with M≤L and where w(k) is a Hann or other type of apodization window.

Several enhancement filters can be defined according to the information available. They can then be used for deducing the mask in the time-frequency domain.

For a source s of given position, the column vector which points in the direction of this source (the direction of arrival of the sound) is labeled as, this vector referred to as the "steering vector". In the case of a uniform linear antenna composed of N sensors, where each sensor is spaced apart from its neighbor by a distance d, the steering vector of a plane wave of incidence e relative to the antenna is defined in the frequency domain in step S4 by:

$$a_s(f) = \begin{bmatrix} 1 \\ e^{-2\pi fd\cos(\theta)/c} \\ \vdots \\ e^{-2\pi f(N-1)d\cos(\theta)/c} \end{bmatrix},$$

where c is the speed of sound in air.

The first channel corresponds here to the last sensor encountered by the sound wave. This steering vector then gives the direction of arrival of the sound or "DOA".

In the case of a first-order 3D ambisonic antenna, typically in SID/N3D format, the steering vector can also be given by the relation:

$$a_s(f) = \begin{bmatrix} 1 \\ \cos(\theta)\cos(\phi) \\ \sin(\theta)\cos(\phi) \\ \sin(\phi) \end{bmatrix},$$

where the pair (θ,ϕ) corresponds to the azimuth and elevation of the source relative to the antenna.

Knowing only the direction of arrival from a sound source (or DOA), in step S5 a filter of the delay-and-sum (DS) type can be defined which points in the direction of this source, as follows:

$w_{DS}=(a_s^H a_s)^{-1}a_s$, where $(.)^H$ is the conjugate transpose operator of a matrix or a vector.

One can also use a slightly more complex but also more powerful filter, such as the MPDR filter (for "Minimum Power Distortionless Response"). This filter requires, in addition to the direction of arrival of the sound emitted by the source, the spatial distribution of the mixture x through its spatial covariance matrix $R_x$:

$$w_{MPDR} = \frac{R_x^{-1} a_s}{a_s^{H} R_x^{-1} a_s},$$

where the spatial covariance of the multidimensional signal captured by the antenna x is given by the following relation:

$$R_x = \mathbb{E}[xx^H]$$

Details of such an implementation are described in particular in reference [@gannotResume] specified in the appendix.

Finally, if the spatial covariance matrices $R_s$ and $R_n$ for the signal of interest s and for the noise n are available, a family of much more efficient filters can be used to apply said second spatial filtering (described below with reference to step S9 of FIG. 2). We simply indicate here, by way of example, that one can use a spatial filtering of the MWF type (for "Multichannel Wiener Filter") for a second filtering, given by the following equation:

$$w_{MWF} = (R_s + R_n)^{-1} R_s e_1, \text{ where } e_1 = [10 \ldots 0]^T,$$

and calling upon the spatial covariance matrices representing the spatial distribution of acoustic energy emitted by a source of interest $R_s$ or by ambient noise $R_n$, and propagating in the acoustic environment. In practice, the acoustic properties—reflection, diffraction, diffusion—of the materials of the enclosing surfaces encountered by the sound waves—walls, ceiling, floor, windows, etc.—vary greatly according to the frequency band concerned. Thereafter, this spatial distribution of energy also depends on the frequency band. Moreover, in the case of moving sources, this spatial covariance can vary over time.

One way to estimate the spatial covariance of the mixture x is to perform a local time-frequency integration:

$$R_x(t, f) = \frac{1}{\mathrm{card}\{\Omega(t, f)\}} \sum_{(t_1, f_1) \in \Omega(t,f)} x(t_1, f_1) x(t_1, f_1)^H$$

where Ω(t,f) is a more or less wide neighborhood around the time-frequency point (t,f), and card is the "cardinal" operator.

From there, it is already possible to estimate the first filtering $w_{MPDR}$ which can be applied in step S5.

For matrices $R_s$ and $R_n$, the situation is different because they are not directly accessible from observations, and must be estimated. In practice, a mask $M_s$(t,f) (respectively $M_n$(t, f)) is used which allows "selecting" the time-frequency points where the relevant source (respectively the noise) is preponderant, which then allows calculating its covariance matrix by classic integration, weighting with an adequate mask of the following type:

$$R_s(t, f) = \frac{1}{\mathrm{card}\{\Omega(t, f)\}} \sum_{(t_1, f_1) \in \Omega(t,f)} M_s(t_1, f_1) x(t_1, f_1) x(t_1, f_1)^H$$

The noise mask $M_n$(t,f) can be derived directly from the mask of interest (i.e. associated with the source of interest) $M_s$(t,f) by the formula: $M_n$(t,f)=1−$M_s$(t,f). In this case, the spatial covariance matrix for the noise can be calculated in the same way as for the relevant signal, and more particularly in the form:

$$R_n(t, f) = \frac{1}{\mathrm{card}\{\Omega(t, f)\}} \sum_{(t_1, f_1) \in \Omega(t,f)} (1 - M_n(t_1, f_1)) x(t_1, f_1) x(t_1, f_1)^H$$

The aim here is to estimate these time-frequency masks $M_s$(t,f) and $M_n$(t,f).

The direction of arrival of the sound (or "DOA", obtained in step S4) originating from the relevant source s at time t, denoted $doa_s$(t), is considered known. This DOA can be estimated by a localization algorithm such as "SRP-phat" ([@diBiaseSRPPhat]), and tracked by a tracking algorithm such as a Kalman filter for example. It can be composed of a single component as in the case of a linear antenna, or of azimuth and elevation components (θ,ϕ) in the case of an ambisonic-type of spherical antenna for example.

Thus, knowing only the DOA of the relevant source s, we seek to estimate these masks in step S7. An enhanced version of the relevant signal in the time-frequency domain is available. This enhanced version is obtained by applying in step S5 a spatial filter $w_s$ which points in the direction of the relevant source. This filter can be of the Delay and Sum type, or, as below, of the $w_{MPDR}$ type presented by:

$$w_s(t) = \begin{cases} \dfrac{R_x^{-1} a_s}{a_s^{H} R_x^{-1} a_s}, & \text{if } a_s(t) \text{ exists} \\ 0, & \text{if not} \end{cases}$$

From this filter, the signal of interest s is enhanced by applying the filter in step S5:

$$\hat{s}(t, f) = w_s^H(t, f) x(t, f)$$

This enhanced signal makes it possible to calculate a preliminary mask $\hat{M}_s^{(0)}$ in step S7, given by the ratios from step S6:

$$\hat{M}_s^{(0)}(t, f) = \left| \frac{\hat{s}(t, f)}{x_{ref}(t, f)} \right|^{\gamma},$$

where $x_{ref}$ is a reference channel originating from the capture, and γ a positive real number. γ typically takes integer values (for example 1 for amplitude or 2 for energy). It should be noted that when →∞, the mask tends towards a binary mask indicating the preponderance of the source over the noise.

For example, for an ambisonic antenna, the first channel, which is the omnidirectional channel, can be used. In the case of a linear antenna, it can be the signal corresponding to any sensor.

In the ideal case where the signal is perfectly enhanced by the filter $w_s$, and γ=1, this mask corresponds to the expression:

$$M_0 = \frac{|s(t, f)|}{|s(t, f) + n(t, f)|},$$

which defines a mask with the desired behavior, namely close to 1 when the signal s is preponderant, and close to 0 when noise is preponderant. In practice, due to the effect of acoustics and imperfections in measuring the DOA from the source, the enhanced signal, although already in better condition than the acquired raw signals, may still contain noise and can be improved by processing to refine the estimation of the mask (step S8).

The mask refinement step S8 is described below. Although this step is advantageous, it is in no way essential and may be carried out optionally, for example if the mask estimated for the filtering in step S7 turns out to be noisy beyond a chosen threshold.

To limit noise in the mask, a smoothing function soft(.) is applied in step S8. Application of this smoothing function can amount to estimating a local average at each time-frequency point, for example as follows:

$$\text{soft}(y)(t,f) = \frac{1}{\text{card}\{\Omega_1(t,f)\}} \sum\nolimits_{(t_1,f_1)\in\Omega_1(t,f)} y[t_1, f_1,$$

where $\Omega_1$(t,f) defines a neighborhood of the time-frequency point (t,f) considered.

Alternatively, one can choose an average weighted by a Gaussian kernel for example, or a median operator which is more robust for outliers.

This smoothing function can be applied either to the observations (ŝ, $x_{ref}$) or to the filter $\hat{M}_s^{(0)}$, as follows:

$$\hat{M}_s^{(1)}(t,f) = \left|\frac{\text{soft}(|s|)(t,f)}{\text{soft}(|x_{ref}|)(t,f)}\right|$$

$$\hat{M}_s^{(1)}(t,f) = \text{soft}(\hat{M}_s^{(0)})(t,f)$$

To improve the estimation, a first saturation step can be applied, which ensures that the mask is indeed within the interval [0,1]:

$$\hat{M}_s^{(2)}(t,f) = \min\left\{\hat{M}_s^{(1)}(t,f), 1\right\}$$

In effect, the above method sometimes leads to underestimating the masks. It can be of interest to "correct" the previous estimates by applying a saturation function sat(.) of the type:

$$sat(u) = \begin{cases} u/u_{th}, & \text{if } u < u_{th} \\ 1, & \text{if not} \end{cases}$$

where $u_{th}$ is a threshold to be set according to the desired level.

Another way to estimate the mask on the basis of raw observations consists of, rather than performing averaging operations, adopting a probabilistic approach by setting R to a random variable defined by:

$$R = \hat{s} - M_s x,$$

where

ŝ corresponds to the enhanced signal (i.e filtered by an MPDR or DS enhancement filter), x corresponds to a particular channel of the mixture, and $M_s$ corresponds to the previously estimated mask for the relevant source: this can be $\hat{M}_s^{(0)}$ or the different variants of $\hat{M}_s^{(1)}$.

These variables can be considered as time- and frequency-dependent.

The variable R|$M_s$ follows a normal distribution, with a zero mean and a variance that depends on $M_s$, as follows:

$$R \mid M_x \sim \mathcal{N}(0, \sigma_x^2)$$

$$V(R \mid M) = V(\hat{s}) + M_x^2 V(x) \Rightarrow \sigma^2 = \sigma_s^2 + M_x^2\sigma_x^2$$

where V(.) is the variance operator.

One can also assume an initial distribution for $M_s$. As it is a mask, with values between 0 and 1, one can assume that the mask follows a uniform law within the interval [0,1]:

$$M_x \sim \mathcal{U}(0, 1)$$

In one variant, it is possible to define another distribution which favors mask parsimony, such as an exponential law for example.

On the basis of the model imposed for the variables described, the mask can be calculated using probabilistic estimators. Here we describe the estimator for mask $M_s$(t,f) in the sense of maximum likelihood.

It is assumed that we have a certain number of observations I for the pair of variables $\{\hat{s}_i, x_i\}_{i=1}^I$. We can select for example a set of observations by choosing a time-frequency box around point (t,f) where we estimate $M_s$(t,f):

$$\{\hat{s}_i, x_i\} = \bigcup\nolimits_{t_1\in[t-\delta_t,t+\delta_t],f_1\in[f-\delta_f,f+\delta_f]} \left(\left|M_s^{(0)}(t,f)x(t_1,f_1)\right|, |x(t_1,f_1)|\right)$$

The likelihood function of the mask is written:

$$p_{R|M_s}(r \mid m_s) = \prod\nolimits_{i=1}^{I} \frac{1}{\sqrt{2\pi}\,\sigma} e^{-\frac{(\hat{s}_i - M_s x_i)^2}{2\sigma^2}}$$

The maximum likelihood estimator is given directly by the expression $$M_s^{MLE} = \frac{-b + \sqrt{b^2 - 4ac}}{2a},$$

with $$\begin{cases} a = \sum x_i^2 - I\sigma_x^2 \\ b = -2\sum \hat{s}_i x_i \\ c = \sum \hat{s}_i^2 - I\sigma_s^2 \end{cases},$$

where $\sigma_s^2$ and $\sigma_x^2$ are the variances of variables $\hat{s}_i$ and $x_i$.

Once again, to avoid values outside the interval [0,1], we can apply a saturation operation of the type:

$$\tilde{M}_s^{MLE} = \max\left\{\min\left\{\tilde{M}_s^{MLE}, 1\right\}, 0\right\}$$

The probabilistic approach procedure is less noisy than the one using local averaging. It presents a lower variance, at the cost of higher complexity due to the required calculation of local statistics. This makes it possible, for example, to correctly estimate the masks in the absence of a useful signal.

The method can continue in step S9 by producing the second spatial filtering on the basis of the weight mask, in particular yielding matrix $M_s$ (as well as the matrix specific to the noise $M_n=1-M_s$) in order to construct a second filter for example of the MWF type, by estimating the spatial covariance matrices $R_s$ and $R_n$ respectively specific to the source of interest and to the noise, and given by:

$$R_s(t, f) = \frac{1}{\text{card}\{\Omega(t, f)\}} \sum_{(t_1, f_1) \in \Omega(t, f)} M_s(t_1, f_1) x(t_1, f_1) x(t_1, f_1)^H$$

$$R_n(t, f) = \frac{1}{\text{card}\{\Omega(t, f)\}} \sum_{(t_1, f_1) \in \Omega(t, f)} (1 - M_s(t_1, f_1)) x(t_1, f_1) x(t_1, f_1)^H$$

where:

- $\Omega(t,f)$ is a neighborhood of a time-frequency point (t,f),
- card is the "cardinal" operator,
- $x(t_1,f_1)$ is a vector representing the sound data acquired in the time-frequency domain, and $x(t_1,f_1)^H$ its Hermitian conjugate, and
- $M_s(t_1,f_1)$ is the expression of the weight mask in the time-frequency domain.

MWF-type spatial filtering is then given by:

$$w_{MWF}(t, f) = (R_s(t, f) + R_n(t, f))^{-1} R_s(t, f) e_1, \text{ where } e_1 = [1\ \ 0\ \ \ldots\ \ 0]^T.$$

As a variant, it should be noted that if the second filtering retained is of the MVDR type, then the second filtering is given by $$w_{MVDR}(t, f) = \frac{R_n^{-1}(t, f) a_s}{a_s^H R_n^{-1}(t, f) a_s}$$

with $$R_n(t, f) = \frac{1}{\text{card}\{\Omega(t, f)\}} \sum_{(t_1, f_1) \in \Omega(t, f)} (1 - M_s(t_1, f_1)) x(t_1, f_1) x(t_1, f_1)^H$$

where $\Omega(t,f)$ and card are as defined above.

Figure 3:
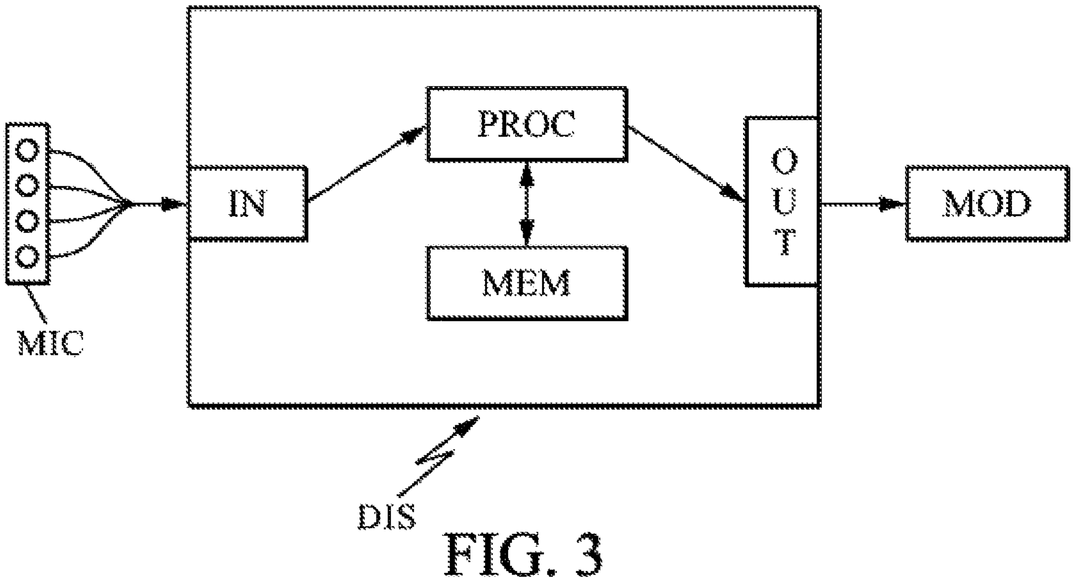
FIG. 3 schematically shows an example of a device for processing sound data according to one embodiment.

Once this second spatial filtering has been applied to the acquired data x(t,f), it is possible to apply an inverse transform (from time-frequency space to direct space) and obtain in step S10 an acoustic signal $\hat{x}(t)$ representing the sound originating from the source of interest and enhanced relative to the ambient noise (typically delivered by the output interface OUT of the device illustrated in FIG. 3).

INDUSTRIAL APPLICATION

These technical solutions find applications in particular in speech enhancement via complex filters, for example MWF-type filters ([@laurelineLSTM], [@amelieUnet]), which ensures good listening quality and a high rate of automatic speech recognition, with no need for a neural network. This approach can be used for the detection of keywords or "wake-up words", or even for transcription of a speech signal.

LIST OF CITED DOCUMENTS

For convenience, the following non-patent references are cited:

[@amelieUnet]: Amélie Bosca et al. "Dilated U-net based approach for multichannel speech enhancement from First-Order Ambisonics recordings". In: Computer Speech& Language(2020), pp. 37-51

[@laurelineLSTM]: L. Perotin et al. "Multichannel speech separation with recurrent neural networks from high-order Ambisonics recordings". In: Proc. of ICASSP.I-CASSP 2018—IEEE International Conference on Acoustics, Speech and Signal Processing. 2018, pp. 36-40.

[@umbachChallenge]: Reinhold Heab-Umbach et al. "Far-Field Automatic Speech Recognition". arXiv: 2009.09395v1.

[@heymannNNmask]: J. Heymann, L. Drude, and R. Haeb-Umbach, "Neural network based spectral mask estimation for acoustic beamforming," in Proc. of ICASSP, 2016, pp. 196-200.

[@janssonUnetSinger]: A. Jansson, E. Humphrey, N. Montecchio, R. Bittner, A. Kumar, and T. Weyde, "Singing voice separation with deep U-net convolutional networks," in Proc. of Int. Soc. for Music Inf. Retrieval, 2017, pp. 745-751.

[@stollerWaveUnet]: D. Stoller, S. Ewert, and S. Dixon, "Wave-U-Net: a multi-scale neural network for end-to-end audio source separation," in Proc. of Int. Soc. for Music Inf. Retrieval, 2018, pp. 334-340.

[@gannotResume]: Sharon Gannot et al. "A Consolidated Perspective on Multimicrophone Speech Enhancement and Source Separation". In: IEEE/ACM Transactions on Audio, Speech, and Language Processing 25.4 (April 2017), pp. 692-730. issn: 2329-9304. doi:10.1109/TASLP.2016.2647702.

[@diBiaseSRPPhat]: J. Dibiase, H. Silverman, and M. Brandstein, "Robust localization in reverberant rooms," in Microphone Arrays: Signal Processing Techniques and Applications. Springer, 2001, pp. 157-180.

Although the present disclosure has been described with reference to one or more examples, workers skilled in the art will recognize that changes may be made in form and detail without departing from the scope of the disclosure and/or the appended claims.

The invention claimed is:

1. A method for processing sound data acquired by a plurality of microphones, wherein the method is implemented by a device and comprises:

on the basis of the sound data acquired by the plurality of microphones, determining a direction of arrival of a sound originating from at least one sound source of interest, applying spatial filtering to the sound data as a function of the direction of arrival of the sound, estimating ratios in a magnitude representative of a signal amplitude in the time-frequency domain, between the filtered sound data and the acquired sound data, and producing, as a function of the estimated ratios, a weight mask to be applied in the time-frequency domain to the acquired sound data in order to construct an acoustic signal representing the sound originating from the at least one sound source of interest.

2. The method according to claim 1, wherein the spatial filtering is of a "Delay and Sum" type.

3. The method according to claim 1, wherein the spatial filtering is applied in the time-frequency domain and is an MPDR type, for "Minimum Power Distortionless Response".

4. The method according to claim 3, wherein the MPDR-type spatial filtering, denoted $w_{MPDR}$, is given by $$w_{MPDR}(t,f) = \frac{R_x^{-1}(t,f)a_s}{a_s^H R_x^{-1}(t,f)a_s},$$

where $a_s$ represents a vector defining the direction of arrival of the sound, and $R_x(t,f)$ is a spatial covariance matrix estimated at each time-frequency point (t,f) by a relation of the type:

$$R_x(t,f) = \frac{1}{\mathrm{card}\{\Omega(t,f)\}} \sum_{(t_1,f_1)\in\Omega(t,f)} x(t_1,f_1)x(t_1,f_1)^H$$

where:

$\Omega(t,f)$ is a neighborhood of the time-frequency point (t,f), card is the "cardinal" operator, $x(t_1,f_1)$ is a vector representing the sound data acquired in the time-frequency domain, and $x(t_1,f_1)^H$ is a Hermitian conjugate.

5. The method according to claim 1, wherein the produced weight mask is further refined by smoothing at each time-frequency point, by applying a local statistical operator calculated over a time-frequency neighborhood of the time-frequency point (t,f) considered, t being a point in time and f being a point in frequency.

6. The method according to claim 1, wherein the produced weight mask is further refined by smoothing at each time-frequency point, and wherein a probabilistic approach is applied which comprises:

considering the weight mask as a random variable, defining a probabilistic estimator of a model of the random variable, searching for an optimum of the probabilistic estimator in order to improve the weight mask.

7. The method according to claim 6, wherein the mask is considered as a uniform random variable within an interval [0,1].

8. The method according to claim 6, wherein the probabilistic estimator of the mask $M_s(t,f)$ is representative of a maximum likelihood, over a plurality of observations of a pair of variables $\{\hat{s}_i, x_i\}_{i=1}^I$ respectively representing:

an acoustic signal $\hat{s}_i$ resulting from applying the weight mask to the acquired sound data, and the acquired sound data $x_i$, said observations being chosen within a neighborhood of the time-frequency point (t,f) considered.

9. The method according to claim 1, wherein the constructing of the acoustic signal representing the sound originating from the at least one sound source of interest comprises applying a second spatial filtering, obtained from the produced weight mask.

10. The method according to claim 9, wherein the second spatial filtering is of the MVDR type, for "Minimum Variance Distortionless Response", and at least one spatial covariance matrix $R_n(t,f)$ for the ambient noise is estimated, the MVDR-type spatial filtering being given by $$w_{MVDR}(t,f) = \frac{R_n^{-1}(t,f)a_s}{a_s^H R_n^{-1}(t,f)a_s},$$

with:

$$R_n(t,f) = \frac{1}{\mathrm{card}\{\Omega(t,f)\}} \sum_{(t_1,f_1)\in\Omega(t,f)} (1 - M_s(t_1,f_1))x(t_1,f_1)x(t_1,f_1)^H$$

where:

$\Omega(t,f)$ is a neighborhood of the time-frequency point (t,f), card is the "cardinal" operator, $x(t_1,f_1)$ is a vector representing the sound data acquired in the time-frequency domain, and $x(t_1,f_1)^H$ is a Hermitian conjugate, and $M_s(t_1,f_1)$ is the expression of the weight mask in the time-frequency domain.

11. The method according to claim 9, wherein the second spatial filtering is of the MWF type (for "Multichannel Wiener Filter"), and spatial covariance matrices $R_s$ and $R_n$ are respectively estimated for the acoustic signal representing the sound originating from the at least one sound source of interest and from the ambient noise, the MWF-type spatial filtering being given by $w_{MWF}(t,f)=(R_s(t,f)+R_n(t,f))^{-1}R_s(t,f)e_1$, where $e_1=[1\ 0\ \ldots\ 0]^T$, with:

$$R_s(t,f) = \frac{1}{\mathrm{card}\{\Omega(t,f)\}} \sum_{(t_1,f_1)\in\Omega(t,f)} M_s(t_1,f_1)x(t_1,f_1)x(t_1,f_1)^H$$

$$R_n(t,f) = \frac{1}{\mathrm{card}\{\Omega(t,f)\}} \sum_{(t_1,f_1)\in\Omega(t,f)} (1 - M_s(t_1,f_1))x(t_1,f_1)x(t_1,f_1)^H$$

where:

$\Omega(t,f)$ is a neighborhood of a time-frequency point (t,f), card is the "cardinal" operator, $x(t_1,f_1)$ is a vector representing the sound data acquired in the time-frequency domain, and $x(t_1,f_1)^H$ is a Hermitian conjugate, and $M_s(t_1,f_1)$ is the expression of the weight mask in the time-frequency domain.

12. A non-transitory computer readable medium storing computer program instructions for implementing a method for processing sound data acquired by a plurality of microphones when this program is executed by a processor, wherein the method comprises:

on the basis of the sound data acquired by the plurality of microphones, determining a direction of arrival of a sound originating from at least one sound source of interest, applying spatial filtering to the sound data as a function of the direction of arrival of the sound, estimating ratios in a magnitude representative of a signal amplitude in the time-frequency domain, between the filtered sound data and the acquired sound data, and producing, as a function of the estimated ratios, a weight mask to be applied in the time-frequency domain to the acquired sound data in order to construct an acoustic signal representing the sound originating from the at least one sound source of interest.

13. A device comprising:

at least one interface for receiving sound data acquired by a plurality of microphones; and a processing circuit configured to:

on the basis of the sound data acquired by the plurality of microphones, determine a direction of arrival of a sound originating from at least one sound source of interest, apply spatial filtering to the sound data as a function of the direction of arrival of the sound, estimate ratios, in the time-frequency domain, in a magnitude representative of a signal amplitude, between the filtered sound data and the acquired sound data, and as a function of the estimated ratios, produce a weight mask to be applied in the time-frequency domain to the acquired sound data in order to construct an acoustic signal representing the sound originating from the at least one sound source of interest.

* * * * *